(12) United States Patent
Ash et al.

(10) Patent No.: US 11,715,334 B2
(45) Date of Patent: Aug. 1, 2023

(54) IMAGE-BASED AUTHENTICATION OF A USER'S LOCATION AT A POINT IN TIME

(71) Applicant: NIPPON TELEGRAPH AND TELEPHONE CORPORATION, Tokyo (JP)

(72) Inventors: David Ash, Kirkland, WA (US); Shmuel Ur, Shorashim (IL); Vlad Dabija, Mountain View, CA (US)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 56 days.

(21) Appl. No.: 17/370,969

(22) Filed: Jul. 8, 2021

(65) Prior Publication Data

US 2023/0009874 A1    Jan. 12, 2023

(51) Int. Cl.
G06V 40/40 (2022.01)
G06V 20/10 (2022.01)
G06V 20/52 (2022.01)
G06F 18/22 (2023.01)

(52) U.S. Cl.
CPC .............. *G06V 40/40* (2022.01); *G06F 18/22* (2023.01); *G06V 20/10* (2022.01); *G06V 20/52* (2022.01)

(58) Field of Classification Search
CPC ........ G06V 40/40; G06V 20/10; G06V 20/52; G06K 9/6201
See application file for complete search history.

(56) References Cited

U.S. PATENT DOCUMENTS

| | | | |
|---|---|---|---|
| 8,306,256 B2 | 11/2012 | Muriello et al. | |
| 10,579,783 B1 | 3/2020 | Aument et al. | |
| 10,691,740 B1* | 6/2020 | Anorga | G06F 16/44 |
| 2012/0054014 A1* | 3/2012 | Cho | G06Q 30/0225 |
| | | | 705/14.39 |
| 2016/0034750 A1* | 2/2016 | Bishop | G08B 13/19667 |
| | | | 382/118 |
| 2017/0142126 A1* | 5/2017 | Chen | G06F 21/36 |
| 2017/0315774 A1* | 11/2017 | Meerbeek | G16H 40/63 |
| 2018/0373858 A1* | 12/2018 | Farkash | G06F 21/31 |
| 2019/0041217 A1* | 2/2019 | Ben-Moshe | G01C 21/025 |
| 2020/0005295 A1* | 1/2020 | Murphy | G06Q 20/405 |
| 2020/0057888 A1* | 2/2020 | Angelakos | G06V 10/44 |
| 2021/0233076 A1* | 7/2021 | Prasad | G06Q 20/32 |
| 2022/0012317 A1* | 1/2022 | Byrne | G06V 40/70 |
| 2022/0267621 A1* | 8/2022 | Omenetto | C09D 11/037 |
| 2022/0335147 A1* | 10/2022 | Yedluri | G06F 21/604 |

* cited by examiner

*Primary Examiner* — Ming Y Hon

(57) ABSTRACT

A computer-implemented method includes: (i) receiving location information that represents a physical location of a user; (ii) receiving a first image that has been captured by the user; (iii) in response to receiving the first image, obtaining a second image that has been captured by a camera and that depicts a particular object in an area around the physical location; (iv) determining whether the first image matches the second image; and (v) in response to determining that the first image matches the second image, determining that the user is authentic.

20 Claims, 8 Drawing Sheets

IMAGE-BASED AUTHENTICATION OF A USER'S LOCATION AT A POINT IN TIME

BACKGROUND

This specification relates to user authentication.

User authentication is performed when a user log in to their account. In general, a password is used for user authentication. In addition to a password, image data can be used for user authentication. Image data for authentication is, for example, a photo of the user's face. For example, a user can take a photo of the user's face with a camera on the user's smartphone.

Image data can be sent to a system for user authentication. For example, a user can register a photo of the user's face. The system can verify that image data sent from a user matches the stored image data for authentication. As a result of the matching, the user can log in to their account.

SUMMARY

One aspect of the subject matter disclosed in this specification can be implemented in methods that includes a method for authenticating a user. The method includes: receiving location information that represents a physical location of a user; receiving a first image that has been captured by the user; in response to receiving the first image, obtaining a second image that has been captured by a camera and that depicts a particular object in an area around the physical location; determining whether the first image matches the second image; and in response to determining that the first image matches the second image, determining that the user is authentic.

Other features and aspects of the subject matter will become apparent from the description, the drawings and the claims.

DETAILED DESCRIPTION

Embodiments are described in detail below with reference to the accompanying drawings. Note that the invention is not limited by the embodiments. Features of the various embodiments can be combined in various manners, provided that these features do not conflict with each other. Like elements are indicated by like reference numbers, and overlapping description is omitted.

1. Introduction

When someone logs on to a network, it is generally necessary to authenticate them. Verifying their physical location is often a very good challenge. Because if someone is at one of the physical locations they are known to frequent, like their home, the chance of their being an attacker is quite low.

This verification is sometimes done using Global Positioning System (GPS) coordinates obtained from the person's mobile device. In other solutions, this is done using an Internet Protocol address (IP address), since an IP address often corresponds at least roughly to geographical location.

However, all these methods are far from fool as both GPS readings and IP addresses can be spoofed by hackers. The problem with these methods is that the GPS readings and IP addresses are potentially vulnerable to hacker attacks.

Figure 1:
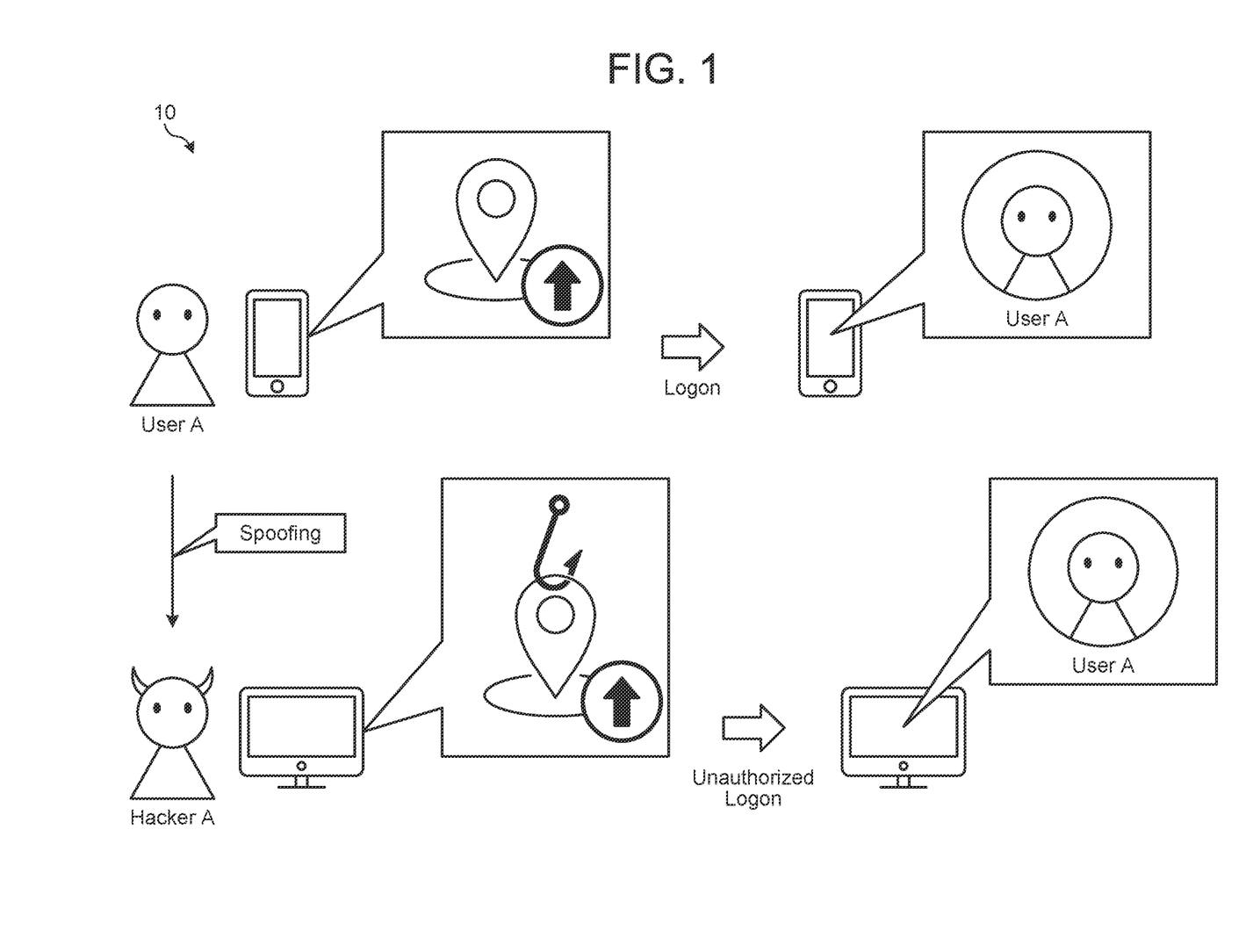
FIG. 1 illustrates an example of a problem with location-based authentication.

FIG. 1 illustrates an example of a problem 10 with location-based authentication. The problem 10 is that the hacker A may be able to spoof GPS readings or IP addresses of the user A. When the user A uses the location-based authentication, the user A submits the GPS reading or IP addresses and logs on to the network. But if the hacker A spoofs GPS reading or IP address, the hacker A can use the spoofed GPS reading or IP addresses for unauthorized logon to the network.

What is needed is a better way to authenticate someone's physical location. To address this problem, an authentication system according to the present disclosure performs one or more authentication processes described below.

2. Environment for User Authentication

First, an environment for user authentication according to the present disclosure will be described with reference to FIG. 2.

Figure 2:
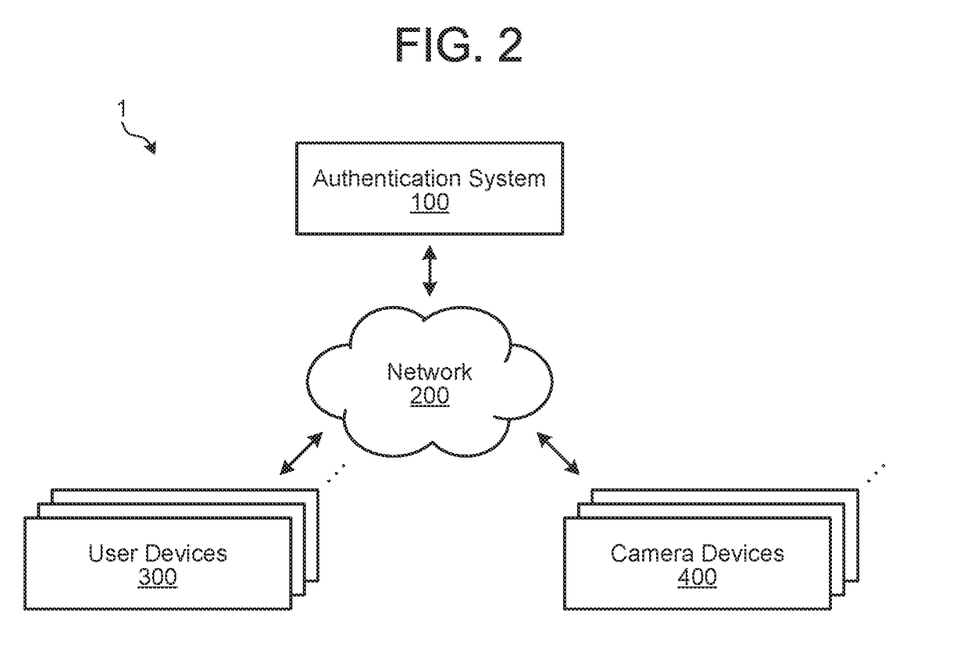
FIG. 2 is a block diagram of an example environment for user authentication.

FIG. 2 is a block diagram of an example environment 1 for user authentication. As illustrated in FIG. 2, the example environment 1 includes an authentication system 100, a network 200, user devices 300 and camera devices 400.

The authentication system 100 is a system that performs one or more authentication processes. The one or more authentication processes includes a process that authenticate a user. An overview of an authentication process according to the present disclosure will be described in the next section.

The authentication system 100 includes one or more data processing apparatus. The data processing apparatus is, for example, a server. For example, the authentication system 100 is implemented as a network security server. An example configuration of the authentication system 100 will be described in Section 4.

The network 200 is, for example, a network such as local area network (LAN), a wide area network (WAN), or the Internet. The network 200 connects the authentication system 100, the user devices 300, and the camera devices 400.

A user device 300 is a device that is used by a user. Examples of user devices 300 includes mobile communication devices (e.g., smart phones), personal computers, and tablet computers.

A camera device 400 is a device that captures an image. Examples of a camera device 400 includes known cameras such as city cameras or security cameras inside buildings. For example, camera devices 400 are known cameras that are likely to be common in large cities.

3. Overview of Authentication Process

Next, an overview of an authentication process according to the present disclosure will be described with reference to FIGS. 3A and 3B. Note that this overview is not intended to limit the scope of the claims nor the embodiments described in the following sections.

Figure 3A:
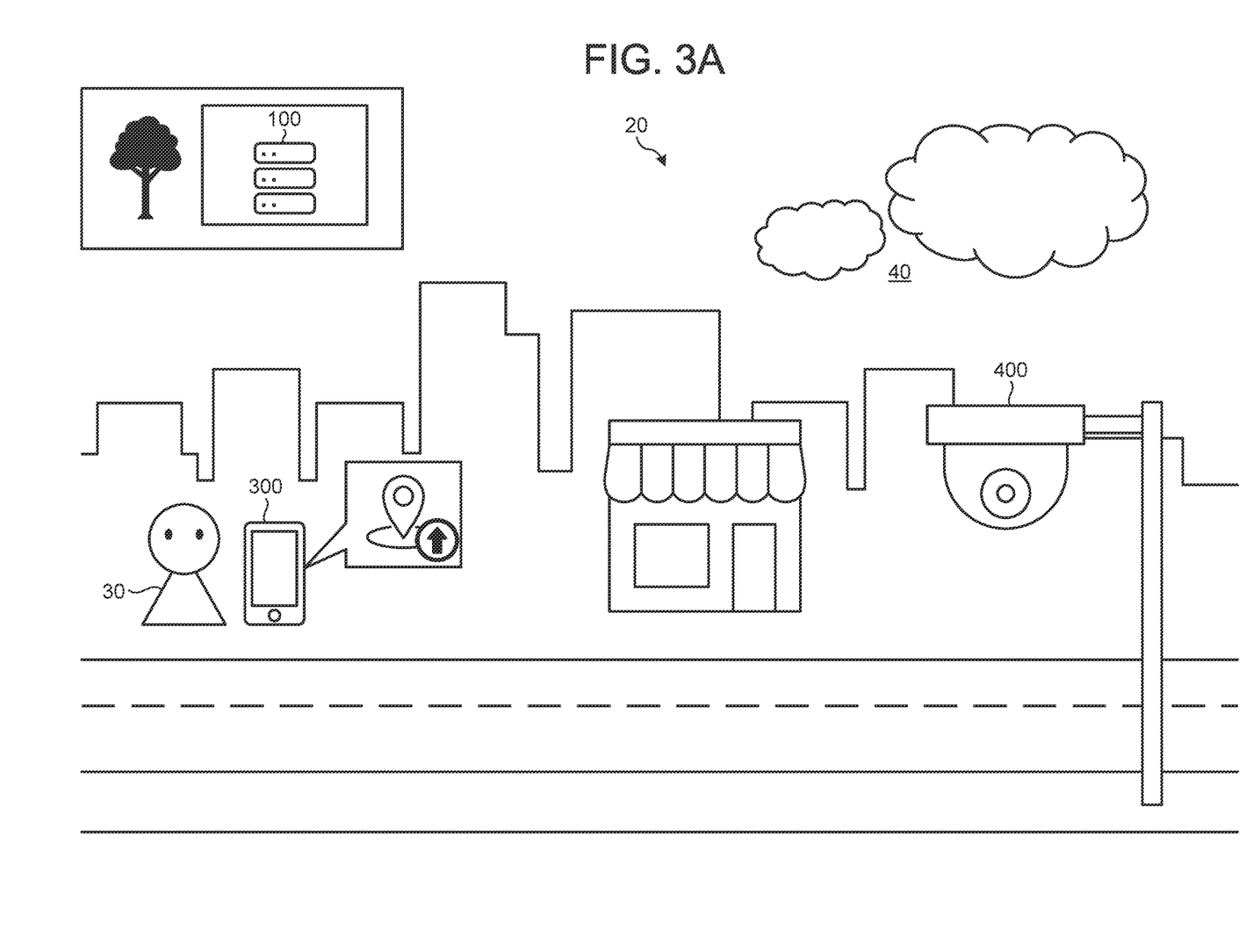
FIGS. 3A and 3B collectively illustrate an overview of an authentication process according to the present disclosure.
Figure 3B:
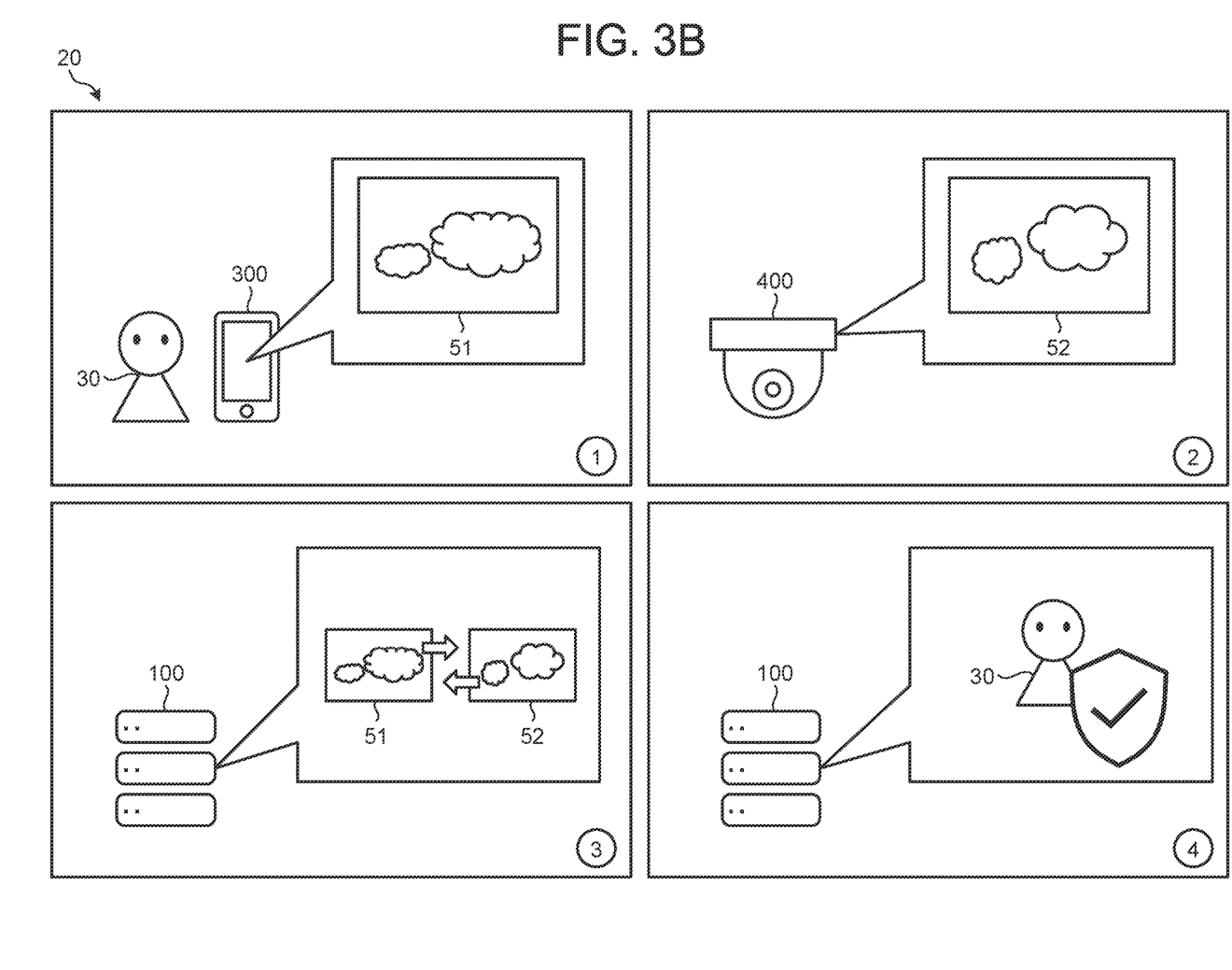

FIGS. 3A and 3B collectively illustrate an overview of an authentication process 20 according to the present disclosure. FIG. 2 is also used to describe the authentication process 20.

Referring to FIG. 3A, in the authentication process 20, a user 30 uses a user device 300 of FIG. 2. The user device 300 is illustrated as a smart phone. As illustrated in FIG. 3A, the user 30 is in a city. The city may be a smart city with the Internet of things (IoT) devices.

A camera device 400 of FIG. 2 is located in the city. The camera device 400 is illustrated as a city camera. In this example, the authentication system 100 of FIG. 2 is in another place. The authentication system 100 is illustrated as a data center. As illustrated in FIG. 3A, a sky 40 stretched out above the city.

The authentication process 20 checks the authenticity of the user 30. When the user 30 attempts to gain access, a hypothesis as to user 30's physical location, is established based on user 30's IP address or GPS information. The user 30 sends user 30's location information (e.g., user 30's IP address or GPS information) to the authentication system 100.

Referring to FIG. 3B, subsequent to sending user 30's location information, the authentication process 20 is performed using photos of the sky 40. The circled numbers illustrate an example sequence of steps.

At step 1, the user 30 is challenged to take a photo of the sky 40 in user 30's location using the user device 300 (e.g., user 30' smartphone). Sensors in the user device 300 can help to determine what portion of the sky the user 30 is pointing the user device 300 at. In this step, the user 30 sends a photo 51 to the authentication system 100.

At step 2, the camera devices 400 are queried for an image of the sky 40 in the area at about the same time stamp. In this example, the camera device 400 sends a photo 52 to the authentication system 100.

At step 3, the authentication system 100 determines whether the photo 51 matches the photo 52. Specific algorithms are used to map what the sky 40 looks like at the location of the camera device 400 to what it should look like at the user device 300.

At step 4, if the photo 51 matches the photo 52, then the user 30 has passed that part of the check (i.e., authentication of a user 30's location at a point in time). Using multiple camera devices 400 and triangulating may help to solve for what the image of the sky 40 should be at user 30's claimed location.

As described above, the authentication process 20 uses photos of the sky 40 in user authentication. The condition of the sky 40 changes every hour. Thus, the data used for user authentication varies randomly. As a result, the authentication process 20 can prevent unauthorized logon by a hacker who spoofs GPS readings or IP addresses of the user 30.

4. Configuration of Authentication System

Next, an example configuration of the authentication system 100 will be described with reference to FIG. 4.

Figure 4:
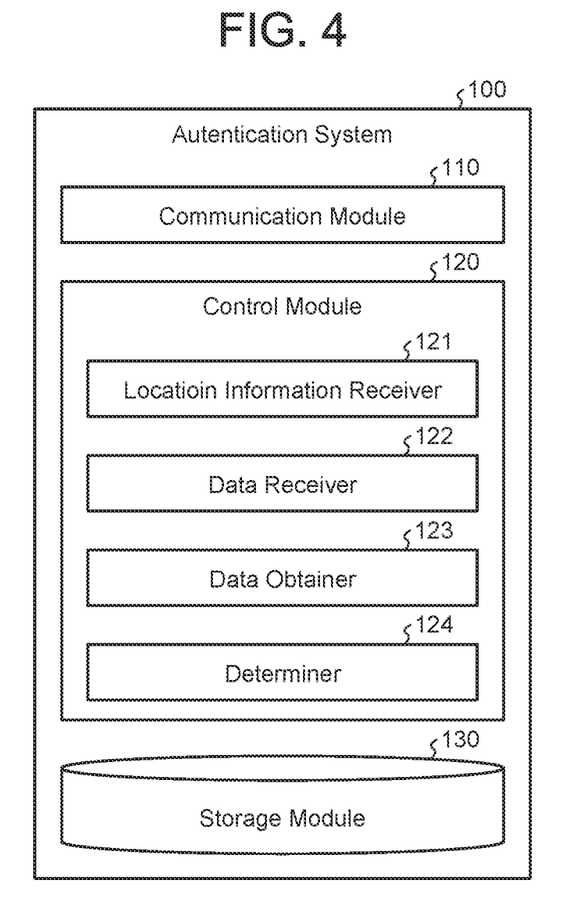
FIG. 4 is a block diagram of an example configuration of an authentication system according to the present disclosure.

FIG. 4 is a block diagram of an example configuration of the authentication system 100 according to the present disclosure. FIG. 2 is also used to describe the example configuration of the authentication system 100.

As illustrated in FIG. 4, the authentication system 100 includes a communication module 110, control module 120, and a storage module 130. The authentication system 100 can include an input module (e.g., a keyboard, a mouse) that receive an input from the administrator of the authentication system 100. Also, the authentication system 100 can include an output module (e.g., a liquid crystal display, an organic light-emitting diode (OLED) display) that displays information to the administrator of the authentication system 100.

4.1. Communication Module 110

The communication module 110 is implemented using, for example, a network interface card (NIC). The communication module 110 is connected to the network 200 in a wired or wireless manner. The communication module 110 can transmit and receive data to and from user devices 300 and camera devices 400 via the network 200.

4.2. Control Module 120

The control module 120 is a controller. The control module 120 is implemented by one or more processors (e.g., a central processing unit (CPU), a micro processing unit (MPU)) that use a random-access memory (RAM) as a work area and that execute various programs stored in a storage device of the authentication system 100. Also, the control module 120 can be implemented by an integrated circuit, such as an application specific integrated circuit (ASIC), a field programmable gate array (FPGA), or a general purpose graphic processing unit (GPGPU).

As illustrated in FIG. 4, the control module 120 includes a location information receiver 121, a data receiver 122, a data obtainer 123, and a determiner 124. One or more processors of the authentication system 100 can implement each control module by executing instructions stored in one or more memories of the authentication system 100. Data processing performed by each control module is an example, and each control module (e.g., the data obtainer 123) may perform data processing described in association with the other control module (e.g., the determiner 124).

4.2.1. Location Information Receiver 121

The location information receiver 121 receives location information from user devices 300. The location information receiver 121 can store the location information in the storage module 130.

The location information represents a physical location of a user. For, example, the location information includes an IP address or GPS information.

4.2.2. Data Receiver 122

The data receiver 122 receives an image that has been captured by the user, from a user devices 300. The data receiver 122 can store the received image in the storage module 130.

The data receiver 122 can make an authentication request. For example, when the location information receiver 121 receives location information from the user, the data receiver 122 challenges the user to send an image of a particular object. The particular object is, for example, a sky in the area around the physical location of the user.

4.2.3. Data Obtainer 123

The data obtainer 123 obtains an image that has been captured by a camera device 400. The data obtainer 123 can have access to the camera devices 400. As an example, the data obtainer 123 obtains the image from a monitoring system for a particular city. In this example, the camera device 400 is a camera located in the particular city. The data obtainer 123 can store the obtained image in the storage module 130.

For example, when the data receiver 122 receives a first image, the data obtainer 123 obtains a second image that has been captured by the camera device 400 and that depicts a particular object (e.g., a sky) in an area around the physical location of the user.

4.2.4. Determiner 124

The determiner 124 determines whether a first image received by the data receiver 122 matches a second image obtained by the data obtainer 123. The determiner 124 can apply matching algorithm to the first image and the second image. The determiner 124 can obtain the location information, the first image, and the second image from the storage module 130. When it is determined that the first image matches the second image, the determiner 124 determines that the user is authentic.

4.3. Storage Module 130

The storage module 130 is implemented using, for example, a semiconductor memory such as a RAM or a flash memory; or a memory device such as a hard disk or an optical disk. The storage module 130 can be used to store location information received by the location information receiver 121, a first image received by the data receiver 122 and a second image obtained by the data obtainer 123.

5. Details of Authentication Processes

The overview of an authentication process according to the present disclosure has been described above with reference to FIGS. 3A and 3B. In this section, examples of authentication processes according to the present disclosure will be described in more detail.

Figure 5:
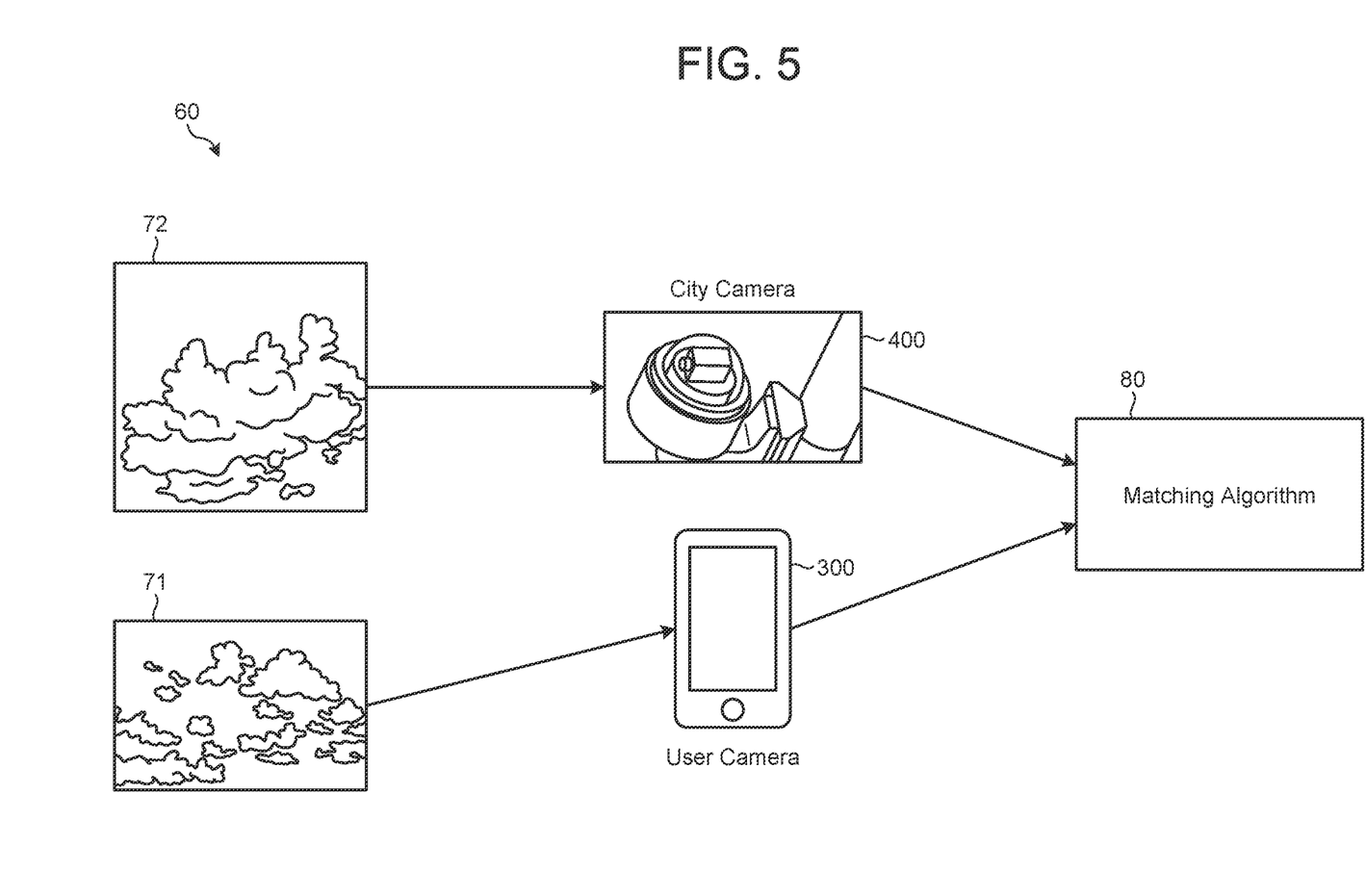
FIG. 5 illustrates an example authentication process according to the present disclosure.

FIG. 5 illustrates an example authentication process 60 according to the present disclosure. FIGS. 2 and 4 are also used to describe the authentication process 60.

In the example authentication process 60, the user device 300 takes an image 71. The user device 300 is illustrated as a user camera. The camera device 400 takes an image 72. The camera device 400 is illustrated as a city camera. The matching algorithm 80 is applied to the image 71 and the image 72.

5.1. General Concept of Authentication Process

A user of the user device 300 claims, via their IP address and/or GPS data, to be in a particular location. The user is then challenged to provide a photo of the sky to the authentication system 100. The authentication system 100 acts as a service provider.

Although such a photo will likely not cover the entire sky, sensors in the user device 300 (e.g., compass or accelerometer, etc.) can help to identify the exact part of the sky that is being photographed.

At approximately the same time, the authentication system 100 has access to camera devices 400 at known locations in the same city. These camera devices 400 are likely to be ubiquitous especially in smart cities. The image 71 that the user provided will then be compared to the image 72 obtained from one of the camera devices 400.

Since the image 72 taken by the camera device 400 is likely not at exactly the same location, or at exactly the same time, as the image 71, the authentication system 100 can apply the matching algorithm 80 to the image 71 and the image 72. The matching algorithm 80 includes a computer vision transformation algorithm for adjusting images. The computer vision transformation algorithm can be used so that the image 71 and the image 72 can be compared.

The computer vision transformation algorithm can use translation, rotation, and possibly extrapolation or interpolation of cloud movements to the city cameras photos to align and match the image(s) taken by the reference cameras with the image taken by the user. Once the adjustment is made, the images can be compared. And if they match then the user is authenticated.

In the example of FIG. 5, the image 71 and the image 72 (e.g., two sky images) look quite different. And there is no set of image transformations that would yield a match. Thus, the user fails authentication.

5.2. Multiple Images Obtained from One or More Cameras

The determiner 124 can extrapolate an image that depicts the particular object from the physical location of the user, based on the plurality of second images. The plurality of second images are images obtained by the data obtainer 123, as described above with reference to FIG. 4. Then, the determiner 124 can determine whether a first image received by the data receiver 122 matches the extrapolated image. When it is determined that the first image matches the extrapolated image, the determiner 124 can determine that the user is authentic.

For example, multiple images can be obtained from the camera device 400 (e.g., one city camera) at different points in time and from the camera devices 400 (e.g., different cameras). These images can be used to build a complete 4D model of the sky at any given point in time, including how specific clouds are moving across the sky. This data can be used to determine more precisely exactly what the sky should look like from the user's vantage point at a particular point in time.

Additionally, the user can be challenged to produce a video of the sky over a short time period, which will contain additional data as to the movements of the clouds which can be compared to that which was obtained from the camera devices 400.

5.3. Defending Against Attacks

One possible issue with this approach is that an attacker could get access to the photos provided by the city cameras by hacking into the city system (e.g., the monitoring system). There are several ways in which the system can guard against this attack.

The data obtainer 123 can obtain a second image that has been captured within a threshold period before or after capturing a first image. The first image is an image received by the data receiver 122, as described above with reference to FIG. 4. The second image is an image obtained by the data obtainer 123, as described above with reference to FIG. 4.

City cameras can record who asked for a sensor/camera reading and at what time stamp, and make this information publicly available. The city system can check and compare if some other person asked for the same photos at the same time, and if so then raise a flag of suspicion, or even as for a second authentication.

All requests for photos to the city cameras can be served with a small delay (say 5 seconds). The user will provide their photo at, for example, 2:00:05 pm and it will be compared with the city camera photo from 2:00:00 pm. However, that photo will not be available to an attacker until sometime after 2:00:05 pm and therefore cannot be used to fake the authentication process. The user sends their photo as soon as the authentication request is made by the authentication system 100. And the authentication system 100 (e.g., the determiner 124) knows the city photo delay time. Thus, the authentication system 100 (e.g., the determiner 124) can use extrapolation to match the two images.

If the user is in a hotel or office, they can be asked to take a photo from their window to which the hacker is unlikely to have access, so the angle of the photo will be unique to the user.

5.4. Objects Used for Authentication Process

The data obtainer 123 can select a particular object from among a plurality of objects based on the physical location of the user. Then, the data obtainer 123 can transmit a message to the user device 300 to allow the user to capture an image that depicts the selected particular object.

Depending on the position of the user in the city, the user may be asked to provide a photo of a different view instead of the sky. For example, if the user is in a high-rise office building or hotel, the photo may contain buildings of the city. The matching algorithm 80 then extracts portions of the images that contain building shades, or other unique visual characteristics of the surrounding environment captured in the user's photo (like objects and lighting characteristics) that can be used to identify locations inside buildings, not just outside, and that can be compared with images from reference cameras available to the authentication system 100 (for example, security cameras inside buildings).

5.5. Application to Smart Cities

In general, the one or more authentication processes require the application of advanced but existing computer vision and image processing software technology. And the one or more authentication processes will be more easily and efficiently applicable with the advent of smart cities and the cameras they provide.

6. Flowchart of the Authentication Process

Next, a flowchart of an example of an authentication process according to the present disclosure will be described with reference to FIG. 6.

Figure 6:
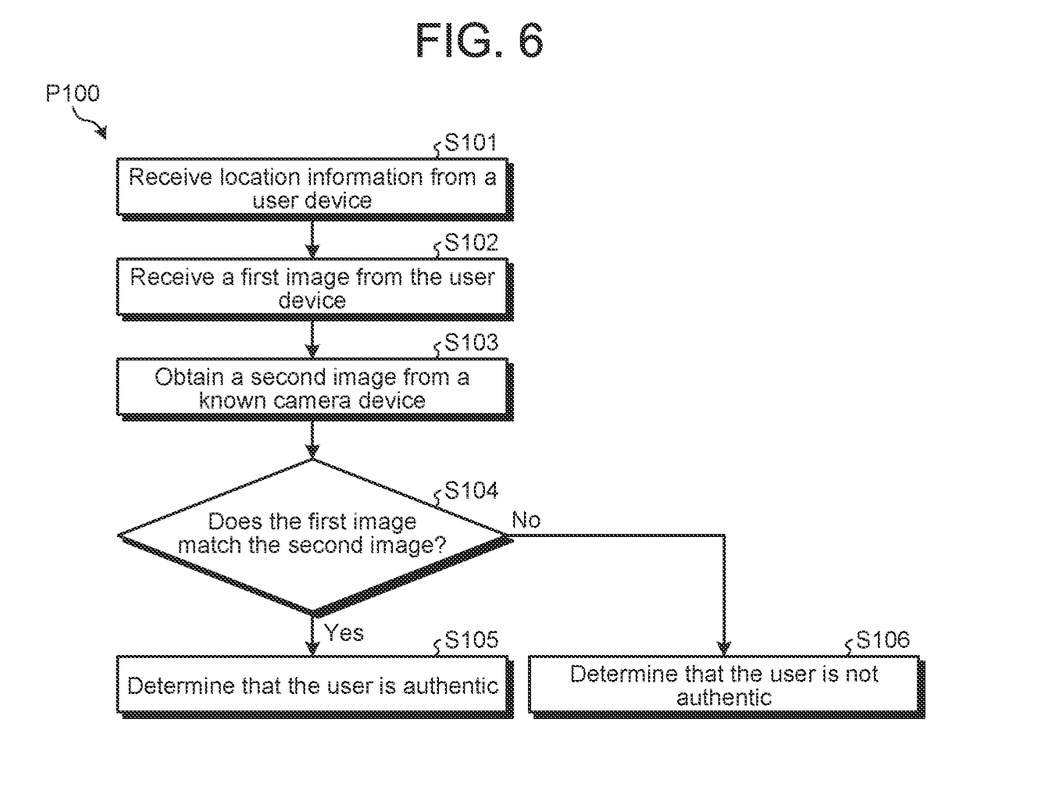
FIG. 6 is a flowchart of an example process for authenticating a user.

FIG. 6 is a flowchart of an example process P100 for authenticating a user. The process P100 can be performed, for example, by the authentication system 100 described above with reference to FIGS. 2 and 4.

As illustrated in FIG. 6, first, location information that represents a physical location of a user is received from a user device (Step S101). For example, the location information receiver 121 of FIG. 4 receive the location information from a user device 300 of FIG. 2.

Then, a first image that has been captured by the user is received from the user device (Step S102). For example, the data receiver 122 of FIG. 4 receives the first image from the user device 300.

In response to receiving the first image a second image, a second image that has been captured by a known camera device and that depicts a particular object in an area around the physical location of the user is obtained from the known camera device (Step S103). For example, when the data receiver 122 receives the first image, the data obtainer 123 of FIG. 4 obtains the second image. As described in Section 5.2, an image that depicts the particular object from the physical location may be extrapolated based on the plurality of second images.

Then, a determination is made as to whether the first image matches the second image (Step S104). For, example, the determiner 124 of FIG. 4 determines whether the first image matches the second image. In addition or alternatively, a determination can be made as to whether the first image matches the extrapolated image.

If the first image matches the second image ("Yes" branch of Step S104), a determination is made that the user is authentic (Step S105). For example, the determiner 124 determines that the user is authentic. In addition or alternatively, if the first image matches the extrapolated image, a determination can be made that the user is authentic.

If the first image does not match the second image ("No" branch of Step S104), a determination is made that the user is not authentic (Step S106). For example, the determiner 124 determines that the user is not authentic. In addition or alternatively, if the first image does not match the extrapolated image, a determination can be made that the user is not authentic.

As described in Section 5.4, the process P100 can further include (i) selecting the particular object from among a plurality of objects based on the physical location, and (ii) transmitting a message to a client device of the user to allow the user to capture an image that depicts the selected particular object.

7. Advantages

The one or more authentication processes according to the present disclosure, is provided as a solution to the problem with location-based authentication. This solution presents essentially an approach for verifying someone's physical location. Its advantage over other solutions to that problem is that it uses a photo of an image that is unique to a particular location and a particular point in time (for example, the configuration of clouds in the sky, or of shades at a location/time, etc.). It is essentially a shared secret that will be known only to cameras in that area at that time.

The approach will be especially strong if multiple cameras cooperate to determine the exact appearance that the sky should have at the appropriate point in time. As such, it is likely to be more secure than other currently used location-based authentication methods.

This approach will be even stronger if there are multiple city cameras that are installed in locations where they have a panoramic view of the sky (e.g., on rooftops). And this approach can develop a complete model of what the sky should look like.

8. Others

Of the processes described in the embodiment, a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

9. Hardware Configuration

Figure 7:
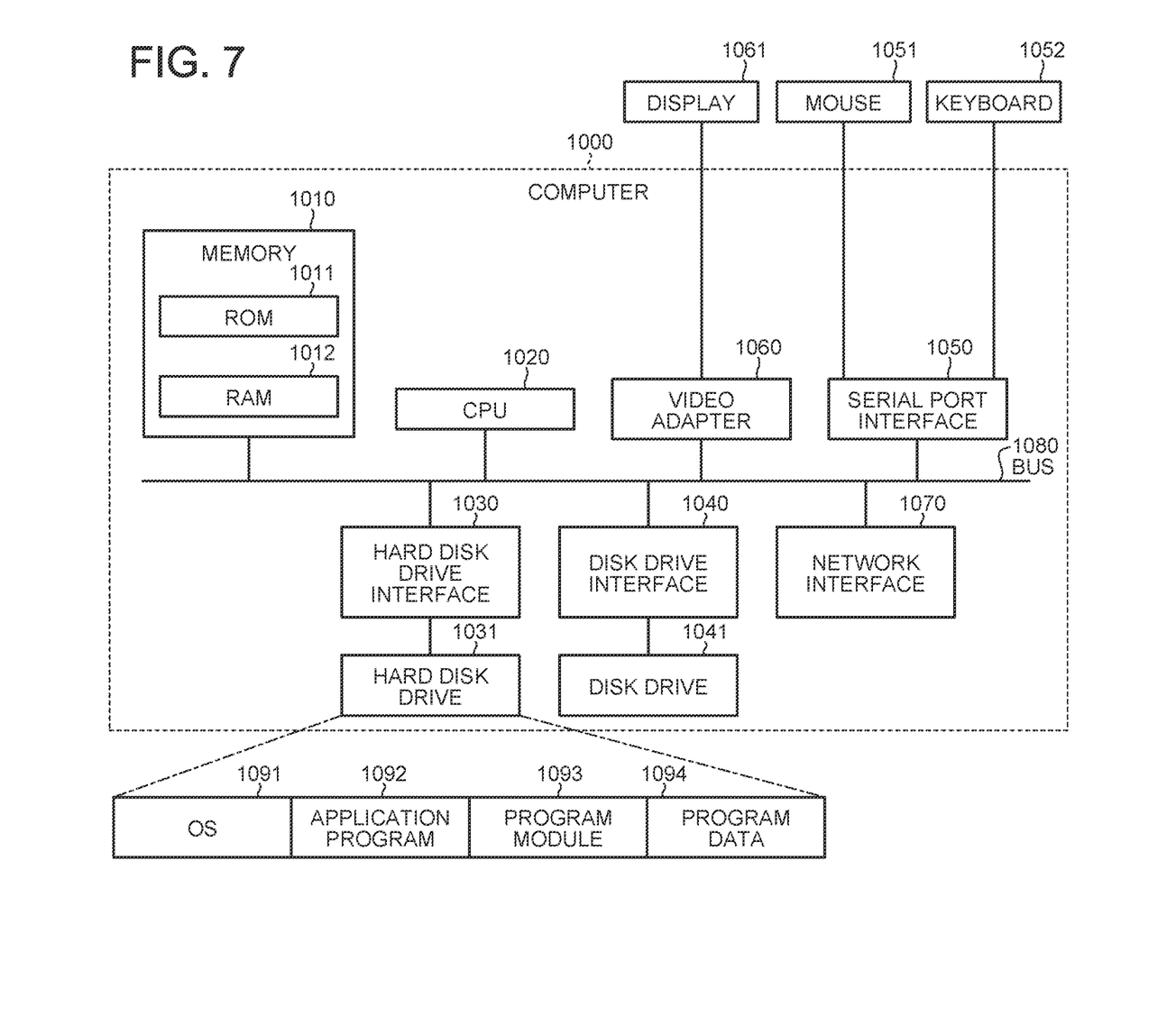
FIG. 7 illustrates an example hardware configuration of a computer.

FIG. 7 illustrates an example hardware configuration of a computer 1000. The systems and methods described in this specification is implemented, for example, using the computer 1000 illustrated in FIG. 7.

A computer program product that describes processing executed by the authentication system 100 in a computer-executable language, can be created. The computer program product contains instructions that, when executed, perform one or more methods, such as those described above. As one embodiment, the authentication system 100 can be implemented by installing a authentication program (i.e., a computer program product for authentication) that executes the one or more authentication processes described above as packaged software and online software into a desired computer. For example, by causing a data-processing device to execute the authentication program described above, the data-processing device can function as the authentication system 100. The data-processing device mentioned here includes a desktop or a laptop personal computer. Besides, mobile communication terminals such as a smartphone, a mobile phone, and a personal handyphone system (PHS), slate terminals such as a personal digital assistant (PDA), and the like, are in the category of the data-processing device. In addition, functions of the authentication system 100 may be implemented in a cloud server.

The computer 1000 illustrated in FIG. 7 is an example of a computer that executes the authentication program. The computer 1000 includes, for example, a memory 1010, a CPU 1020, a hard disk drive interface 1030, a disk drive interface 1040, a serial port interface 1050, a video adapter 1060, and a network interface 1070. Those units are connected one another by a bus 1080.

The memory 1010 includes a read only memory (ROM) 1011 and a RAM 1012. The ROM 1011 stores therein, for example, a boot program of a basic input output system (BIOS) and the like. The hard disk drive interface 1030 is connected to a hard disk drive 1031. The disk drive interface 1040 is connected to a disk drive 1041. For example, attachable/detachable storage media such as a magnetic disk and an optical disk are inserted into the disk drive 1041. For example, a mouse 1051 and a keyboard 1052 are connected to the serial port interface 1050. For example, a display 1061 is connected to the video adapter 1060.

The hard disk drive 1031 stores therein, for example, an operating system (OS) 1091, an application program 1092, a program module 1093, and program data 1094. Each piece of information described in the embodiments, is stored in, for example, the hard disk drive 1031 and the memory 1010.

A computer program product for authentication is tangibly embodied in a non-transitory computer readable storage device. In the example of FIG. 7, the authentication program is stored in the hard disk drive 1031 as, for example, the program module 1093 that describes commands executed by the computer 1000. Specifically, the program module 1093 that describes each process executed by the authentication system 100 described in the embodiments, is stored in the hard disk drive 1031.

Data used in data processing by the authentication program is stored as the program data 1094 in, for example, the hard disk drive 1031. The CPU 1020 reads the program module 1093 and the program data 1094 stored in the hard disk drive 1031 into the RAM 1012 as needed, and executes each procedure described above.

The program module 1093 and the program data 1094 according to the authentication program are not always stored in the hard disk drive 1031, and may be stored in, for example, an attachable/detachable storage medium and be read by the CPU 1020 via the disk drive 1041 and the like. The program module 1093 and the program data 1094 according to the authentication program may be stored in the other computer connected via networks such as a LAN and a WAN, and may be read by the CPU 1020 via the network interface 1070.

10. Summary of Embodiments

As described above, the authentication system 100 according to the present disclosure includes: (i) the location information receiver 121, (ii) the data receiver 122, (iii) the data obtainer 123, and (iv) the determiner 124.

In at least one embodiment, the location information receiver 121 receives location information that represents a physical location of a user. In at least one embodiment, the data receiver 122 receives a first image that has been captured by the user. In at least one embodiment, when the data receiver 122 receives the first image, the data obtainer 123 obtains a second image that has been captured by a camera and that depicts a particular object in an area around the physical location. In at least one embodiment, the determiner 124 determines whether the first image matches the second image. When it is determined that the first image matches the second image, the determiner 124 determines that the user is authentic.

In some embodiments, the second image has been captured within a threshold period before or after capturing the first image.

In some embodiments, the particular object is a sky in the area around the physical location.

In some embodiments, the location information includes an IP address or GPS information.

In some embodiments, the data obtainer 123 obtains the second image from a monitoring system for a particular city. In some embodiments, the camera is located in the particular city.

In some embodiments, the second image is one of a plurality of second images that have been captured by a plurality of cameras and that depict the particular object. In some embodiments, the determiner 124 extrapolates an image that depicts the particular object from the physical location, based on the plurality of second images. Then, the determiner 124 determines whether the first image matches the extrapolated image. When it is determined that the first image matches the extrapolated image, the determiner 124 determines that the user is authentic.

In some embodiments, the data obtainer 123 selects the particular object from among a plurality of objects based on the physical location. Then, the data obtainer 123 transmits a message to a client device of the user to allow the user to capture an image that depicts the selected particular object.

Although various embodiments have been described in detail herein with reference to the accompanying drawings, theses embodiments are examples and are not intended to limit the invention to these embodiments. The features described herein can be implemented in various ways, including various modifications and improvements based on the knowledge of a person skilled in the art.

What is claimed is:

1. A computer-implemented method comprising:
   receiving location information that represents a first physical location of a user;
   receiving a first image that has been captured by the user using a first camera at the first physical location, wherein the first image depicts a selected object;
   in response to receiving the first image, obtaining, based on the selected object, a second image that has been captured by a second camera, wherein the second camera is associated with a second physical location, and the second image depicts the selected object, and wherein the second camera is distinct from the first camera;

determining, based on mapping the second image according to the first physical location using the selected object, whether the first image substantially matches the second image; and in response to determining that the first image substantially matches the second image, determining that the user is authentic.

2. The method of claim 1 wherein the second image has been captured within a threshold period before or after capturing the first image.

3. The method of claim 1 wherein the selected object includes a sky in the area visible from the first physical location.

4. The method of claim 1 wherein the location information includes an Internet Protocol (IP) address or global positioning system (GPS) information.

5. The method of claim 1 wherein obtaining the second image includes obtaining the second image from a monitoring system for a particular city, and wherein the second camera is located in the particular city and is at least a part of the monitoring system.

6. The method of claim 1 wherein the second image is one of a plurality of images that have been captured by a plurality of monitoring cameras and that depict the selected object, wherein the plurality of monitoring cameras includes the second camera, and wherein determining whether the first image substantially matches the second image includes:

extrapolating, based at least on the second image, a third image that depicts the selected object from the first physical location; and determining whether the first image substantially matches the extrapolated third image.

7. The method of claim 1 further comprising:

selecting the selected object from among a plurality of objects based on the first physical location; and transmitting a message to a client device of the user to allow the user to capture an image that depicts the selected object.

8. A system comprising:

one or more processors; and one or more memory including instructions that when executed cause the one or more processors to:

receive location information that represents a first physical location of a user;

receive a first image that has been captured by the user using a first camera at the first physical location, wherein the first image depicts a selected object;

in response to receiving the first image, based on the selected object, obtain a second image that has been captured by a second camera, wherein the second camera is associated with a second physical location, and the second image depicts the selected a object, and wherein the second camera is distinct from the first camera;

determine, based on mapping the second image according to the first physical location using the selected object, whether the first image substantially matches the second image; and in response to determining that the first image substantially matches the second image, determine that the user is authentic.

9. The system of claim 8 wherein the second image has been captured within a threshold period before or after capturing the first image.

10. The system of claim 8 wherein the selected object includes a sky in the area visible from the physical location.

11. The system of claim 8 wherein the location information includes an Internet Protocol (IP) address or global positioning system (GPS) information.

12. The system of claim 8 wherein obtaining the second image includes obtaining the second image from a monitoring system for a particular city, and wherein the second camera is located in the particular city and is at least a part of the monitoring system.

13. The system of claim 8 wherein the second image is one of a plurality of images that have been captured by a plurality of monitoring cameras and that depict the selected object, wherein the plurality of monitoring cameras includes the second camera, and wherein determining whether the first image substantially matches the second image includes:

extrapolating, based at least on the second image, a third image that depicts the selected object from the first physical location; and determining whether the first image substantially matches the extrapolated third image.

14. The system of claim 8 wherein the instructions further comprises instructions that when executed cause the one or more processors to:

select the selected object from among a plurality of objects based on the first physical location; and transmit a message to a client device of the user to allow the user to capture an image that depicts the selected object.

15. A computer program product tangibly embodied in a non-transitory computer-readable medium comprising instructions that, when executed by a processor, cause the processor to:

receive location information that represents a first physical location of a user;

receive a first image that has been captured by the user using a first camera at the first physical location, wherein the first image depicts a selected object;

in response to receiving the first image, obtain, based on the selected object, a second image that has been captured by a second camera, wherein the second camera is associated with a second physical location, and the second image depicts the selected object, and wherein the second camera is distinct from the first camera;

determine, based on mapping the second image according to the first physical location using the selected object, whether the first image substantially matches the second image; and in response to determining that the first image substantially matches the second image, determine that the user is authentic.

16. The product of claim 15 wherein the second image has been captured within a threshold period before or after capturing the first image.

17. The product of claim 15 wherein the selected object includes a sky in the area visible from the first physical location.

18. The product of claim 15 wherein the location information includes an Internet Protocol (IP) address or global positioning system (GPS) information.

19. The product of claim 15 wherein obtaining the second image includes obtaining the second image from a monitoring system for a particular city, and wherein the second camera is located in the particular city and is at least a part of the monitoring system.

20. The product of claim 15 wherein the second image is one of a plurality of images that have been captured by a plurality of monitoring cameras and that depict the selected object, wherein the plurality of monitoring cameras includes the second camera, and wherein determining whether the first image substantially matches the second image includes:
  extrapolating, based at least on the second image, a third image that depicts the selected object from the first physical location; and
  determining whether the first image substantially matches the extrapolated third image.

\* \* \* \* \*